US012539747B2

(12) United States Patent
Yamasaki et al.

(10) Patent No.: US 12,539,747 B2

(45) Date of Patent: Feb. 3, 2026

(54) DRIVE DEVICE FOR VEHICLE

(71) Applicant: AISIN CORPORATION, Aichi (JP)

(72) Inventors: Shoichi Yamasaki, Kariya (JP); Takeshi Torii, Kariya (JP); Chihiro Onishi, Kariya (JP); Soichiro Hattori, Kariya (JP); Takafumi Komori, Kariya (JP)

(73) Assignee: AISIN CORPORATION, Kariya (JP)

(*) Notice: Subject to any disclaimer, the term of this patent is extended or adjusted under 35 U.S.C. 154(b) by 1 day.

(21) Appl. No.: 18/699,750

(22) PCT Filed: Nov. 24, 2022

(86) PCT No.: PCT/JP2022/043312

§ 371 (c)(1),
(2) Date: Apr. 9, 2024

(87) PCT Pub. No.: WO2023/095822

PCT Pub. Date: Jun. 1, 2023

(65) Prior Publication Data

US 2025/0242676 A1 Jul. 31, 2025

(30) Foreign Application Priority Data

Nov. 24, 2021 (JP) ................................ 2021-190506
Nov. 25, 2021 (JP) ................................ 2021-190916

(51) Int. Cl.
*B60L 15/00* (2006.01)
*B60K 1/00* (2006.01)
(Continued)

(52) U.S. Cl.
CPC .............. *B60K 1/00* (2013.01); *B60K 17/165* (2013.01); *B60L 15/007* (2013.01);
(Continued)

(58) Field of Classification Search
CPC .................... B60K 1/00; B60K 17/165; B60K 2001/001; B60K 2007/0061; B60L 15/007;
(Continued)

(56) References Cited

U.S. PATENT DOCUMENTS

| | | | | |
|---|---|---|---|---|
| 9,156,348 | B1 * | 10/2015 | Swales .................... | B60K 1/00 |
| 11,054,001 | B1 | 7/2021 | Tamai et al. | |
| 11,273,701 | B2 * | 3/2022 | Devreese ............ | B60K 7/0007 |

(Continued)

FOREIGN PATENT DOCUMENTS

| | | | | |
|---|---|---|---|---|
| DE | 10 2019 103711 A1 | 8/2020 | | |
| DE | 102020207841 A1 * | 12/2020 | ............... | H02K 9/19 |

(Continued)

OTHER PUBLICATIONS

Feb. 14, 2023 International Search Report issued in International Patent Application No. PCT/JP2022/043312.
Nov. 13, 2024 extended Search Report issued in European Patent Application No. 22898604.8.

*Primary Examiner* — Justin Holmes
(74) *Attorney, Agent, or Firm* — Oliff PLC

(57) ABSTRACT

A second gear meshes with a first gear and is connected to an output member so as to rotate integrally with each other. A rotor, a planetary gear mechanism, and the first gear are disposed on a first axis in a described order from an axial first side toward an axial second side. A connecting member, a differential gear mechanism, and the second gear are disposed on a second axis parallel to the first axis in a described order from the axial first side toward the axial second side. The planetary gear mechanism has a smaller diameter than a rotating electric machine and a larger diameter than the first gear. The differential gear mechanism has a smaller diameter than the second gear and larger diameter than the connecting member.

15 Claims, 8 Drawing Sheets

(51) Int. Cl.

| | |
|---|---|
| ***B60K 17/16*** | (2006.01) |
| ***F16H 37/08*** | (2006.01) |
| ***F16H 57/04*** | (2010.01) |
| *B60K 7/00* | (2006.01) |

(52) U.S. Cl.
CPC ......... *F16H 37/082* (2013.01); *F16H 57/045* (2013.01); *B60K 2001/001* (2013.01); *B60K 2007/0061* (2013.01); *F16H 57/0457* (2013.01); *F16H 57/0483* (2013.01)

(58) Field of Classification Search
CPC ................. F16H 37/082; F16H 57/045; F16H 57/0457; F16H 57/0483
See application file for complete search history.

(56) References Cited

U.S. PATENT DOCUMENTS

| | | | |
|---|---|---|---|
| 2011/0207570 | A1 | 8/2011 | Tanaka et al. |
| 2019/0229582 | A1 | 7/2019 | Ito et al. |
| 2022/0186823 | A1 | 6/2022 | Yamashita et al. |
| 2022/0274476 | A1 | 9/2022 | Yamashita et al. |

FOREIGN PATENT DOCUMENTS

| | | | | | |
|---|---|---|---|---|---|
| JP | 2012075289 | A | * | 4/2012 | |
| JP | 5016076 | B2 | | 9/2012 | |
| JP | 2019-129608 | A | | 8/2019 | |
| JP | 2020153420 | A | * | 9/2020 | ......... F16H 57/0434 |
| JP | 2020-175707 | A | | 10/2020 | |
| WO | WO-2010100541 | A1 | * | 9/2010 | ............... B60K 1/00 |
| WO | 2021/140712 | A1 | | 7/2021 | |

* cited by examiner

DRIVE DEVICE FOR VEHICLE

TECHNICAL FIELD

The present disclosure relates to a drive device for vehicle including a rotating electric machine including a rotor, an output member drivingly connected to a wheel, a power transmission mechanism that transmits rotation of the rotor to the output member, and a differential gear mechanism that distributes torque transmitted to the output member to a pair of the wheels.

BACKGROUND ART

An example of such a drive device for vehicle is disclosed in Patent Literature 1 below. In the following description of "BACKGROUND ART" and "TECHNICAL PROBLEMS", reference numerals in Patent Literature 1 are cited in parentheses.

In a drive device for vehicle (100) of Patent Literature 1, a power transmission mechanism that transmits rotation of a rotor (12) of a rotating electric machine (1) to a differential case (33) as an output member includes a transmission gear mechanism (21), a transmission output gear (22) to which rotation after transmission by the transmission gear mechanism (21) is transmitted, and a differential input gear (31) meshing with the transmission output gear (22). The differential gear mechanism (3) distributes the rotation transmitted to the differential input gear (31) to a pair of wheels (W). In this drive device for vehicle (100), by disposing the differential input gear (31) so as to overlap both the rotating electric machine (1) and the transmission gear mechanism (21) in axial direction view, an increase in the dimension of the drive device for vehicle (100) in a radial direction (R) is suppressed.

CITATIONS LIST

Patent Literature

Patent Literature 1: JP 2020-175707 A

SUMMARY OF DISCLOSURE

Technical Problems

Meanwhile, as shown in FIG. 1 of Patent Literature 1, in this drive device for vehicle (100), on a first axis (A1) on which the transmission output gear (22) with which the differential input gear (31) meshes is disposed, the rotating electric machine (1) having a larger diameter than the transmission output gear (22) and the transmission gear mechanism (21) having a larger diameter than the transmission output gear (22) are disposed separately on both sides in an axial direction (L) with respect to the transmission output gear (22). Therefore, even in a case where a second axis (A2) on which the differential input gear (31) is disposed is disposed close to the first axis (A1), interference between a member disposed on the second axis (A2) and a member having a relatively large diameter disposed on the first axis (A1) needs to be avoided on both sides in the axial direction (L) with respect to the transmission output gear (22), and there is a possibility that downsizing of the dimension in the radial direction (R) of the drive device for vehicle (100) is hindered.

Therefore, it is desired to realize a technique that can easily suppress the radial dimension of the drive device for vehicle small.

Solutions to Problems

In view of the above, a drive device for vehicle has a characteristic configuration including:

a rotating electric machine including a rotor;

an output member drivingly connected to a wheel included in a vehicle;

a power transmission mechanism that transmits rotation of the rotor to the output member; and a differential gear mechanism that distributes torque transmitted to the output member to a pair of the wheels, in which the power transmission mechanism includes a planetary gear mechanism, a first gear, and a second gear, the second gear meshes with the first gear and is connected to the output member so as to rotate integrally with the output member, defining that a direction along a rotation axis of the rotor is an axial direction, one side in the axial direction is an axial first side, the other side in the axial direction is an axial second side, and one of the pair of wheels disposed on the axial first side is a target wheel, the differential gear mechanism is connected to the target wheel via a connecting member, the rotor, the planetary gear mechanism, and the first gear are disposed on a first axis in a described order from the axial first side toward the axial second side, the connecting member, the differential gear mechanism, and the second gear are disposed on a second axis parallel to the first axis in a described order from the axial first side toward the axial second side, the planetary gear mechanism has a smaller diameter than the rotating electric machine and a larger diameter than the first gear, and the differential gear mechanism has a smaller diameter than the second gear and a larger diameter than the connecting member.

According to this characteristic configuration, the rotating electric machine, the planetary gear mechanism, and the first gear disposed on the first axis are disposed in the order in which the radial dimension gradually decreases from the axial first side toward the axial second side, and the connecting member, the differential gear mechanism, and the second gear disposed on the second axis are disposed in the order in which the radial dimension gradually increases from the axial first side toward the axial second side. Therefore, an inter-axis distance between the first axis and the second axis is suppressed short easily while interference between each element on the first axis and each element on the second axis are avoided, and the radial dimension of the drive device for vehicle can be easily suppressed small.

DESCRIPTION OF EMBODIMENTS

1. First Embodiment

Figure 1:
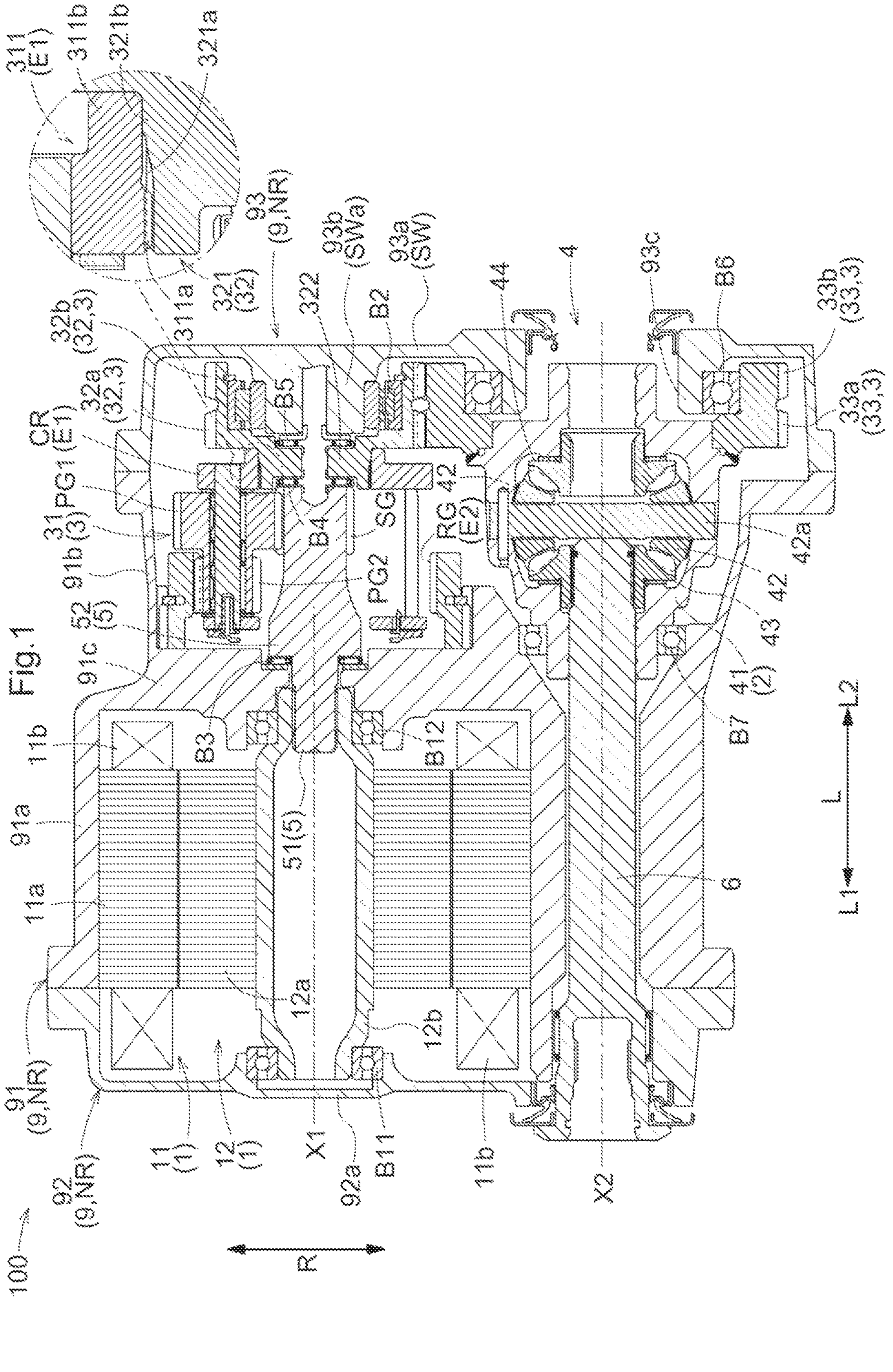
FIG. 1 is a cross-sectional view along an axial direction of a drive device for vehicle according to a first embodiment.
Figure 2:
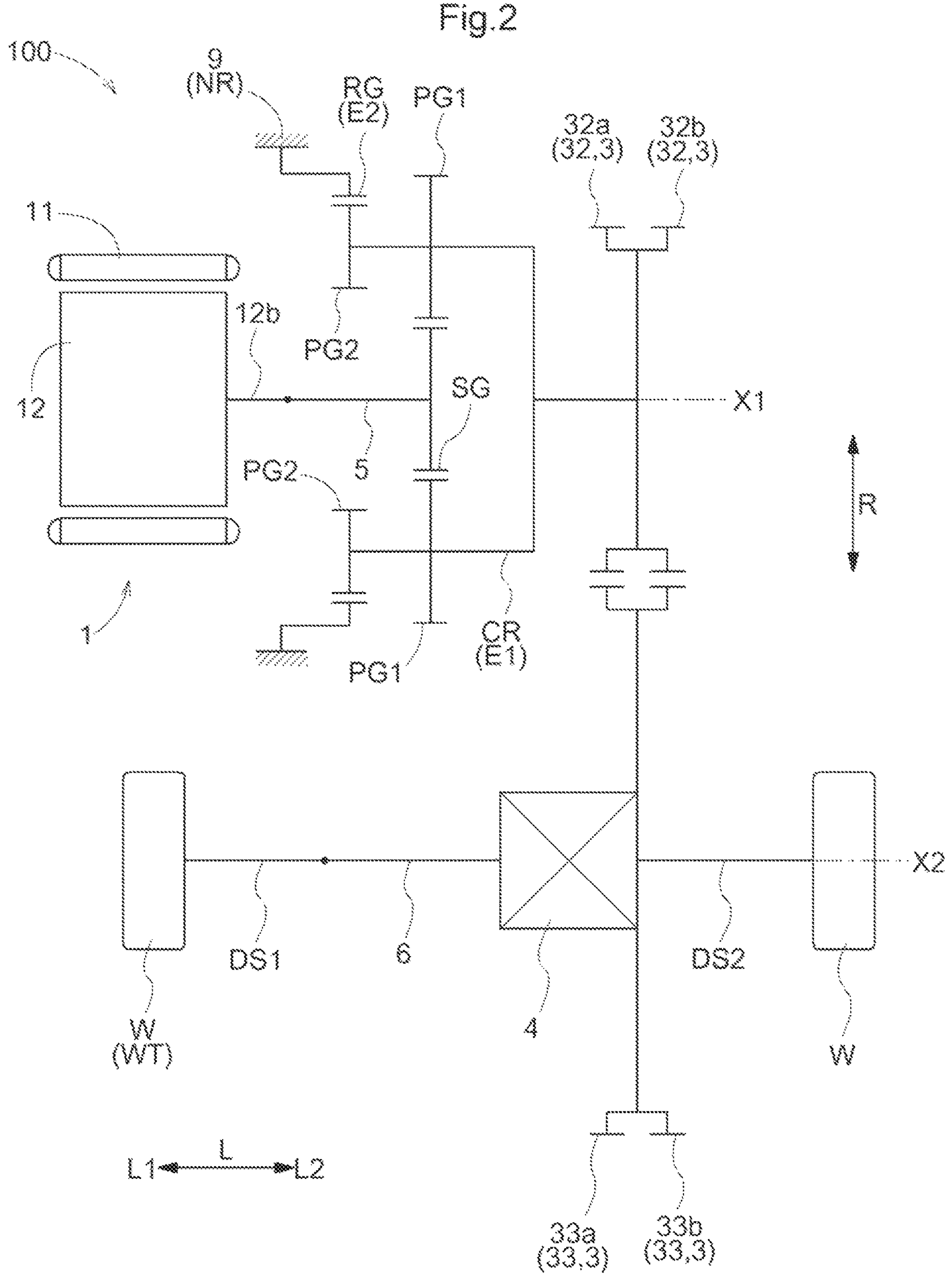
FIG. 2 is a skeleton view of the drive device for vehicle according to the first embodiment.

Hereinafter, a drive device for vehicle 100 according to a first embodiment is described with reference to the drawings. As illustrated in FIGS. 1 and 2, the drive device for vehicle 100 includes a rotating electric machine 1, an output member 2, and a power transmission mechanism 3. In the present embodiment, the drive device for vehicle 100 further includes a differential gear mechanism 4 and a case 9.

The rotating electric machine 1 includes a stator 11 and a rotor 12. An axial direction L to be described later is a direction along a rotation axis of the rotor 12. The rotating electric machine 1 functions as a driving force source for wheels W (see FIG. 2). The rotating electric machine 1 has a function as a motor (electric motor) that receives electric power supply and generates motive power, and a function as a generator that receives motive power supply and generates electric power. Specifically, the rotating electric machine 1 is electrically connected to a power storage device (not illustrated) such as a battery and a capacitor. The rotating electric machine 1 is powered by the electric power stored in the power storage device to generate driving force. In addition, the rotating electric machine 1 performs power generation by the driving force transmitted from the wheels W side to charge the power storage device.

The output member 2 is drivingly connected to the wheels W of a vehicle (vehicle on which the drive device for vehicle 100 is mounted). The power transmission mechanism 3 is configured to transmit the rotation of the rotor 12 to the output member 2. The power transmission mechanism 3 includes a planetary gear mechanism 31, a first gear 32, and a second gear 33. The differential gear mechanism 4 is configured to distribute torque transmitted to the output member 2 to the pair of wheels W.

Here, in the present application, "drivingly connected" refers to a state in which two rotating elements are connected so as to be able to transmit driving force, and includes a state in which the two rotating elements are connected so as to rotate integrally, or a state in which the two rotating elements are connected so as to be able to transmit driving force via one or two or more transmission members. Examples of such a transmission member include various members that transmit rotation at the same speed or at a variable speed, such as a shaft, a gear mechanism, a belt, and a chain. Note that, as the transmission member, an engagement device that selectively transmits rotation and driving force, for example, a friction engagement device, a meshing engagement device, or the like may be included. However, the term "drivingly connected" for each rotating element of the planetary gear mechanism refers to a state in which a plurality of the rotating elements in the planetary gear mechanism are connected to each other without another rotating element interposed therebetween.

The rotor 12, the planetary gear mechanism 31, and the first gear 32 are disposed on a first axis X1 which is an axial center thereof. Furthermore, the output member 2 and the second gear 33 are disposed on a second axis X2 which is an axial center thereof. In the present embodiment, the differential gear mechanism 4 is also disposed on the second axis X2. The first axis X1 and the second axis X2 are disposed so as to be parallel to each other.

In the following description, a direction parallel to the first axis X1 and the second axis X2 is referred to as an "axial direction L" of the drive device for vehicle 100. One side in the axial direction L is referred to as an "axial first side L1", and the other side in the axial direction L is referred to as an "axial second side L2". In the present embodiment, in the axial direction L, the side on which the rotor 12 is disposed with respect to the planetary gear mechanism 31 is defined as the axial first side L1, and the opposite side thereto is defined as the axial second side L2. In addition, a direction orthogonal to each of the first axis X1 and the second axis X2 is referred to as a "radial direction R" with respect to each axis. Note that, in a case where it is not necessary to distinguish which axis is to be used as a reference, or in a case where it is clear which axis is to be used as a reference, there are cases where the term is simply referred to as the "radial direction R".

As illustrated in FIG. 1, the case 9 houses the rotating electric machine 1 and the power transmission mechanism 3. In the present embodiment, the case 9 also houses the output member 2 and the differential gear mechanism 4.

In the present embodiment, the case 9 includes a first case portion 91, a second case portion 92 joined to the first case portion 91 from the axial first side L1, and a third case portion 93 joined to the first case portion 91 from the axial second side L2.

The first case portion 91 includes a first peripheral wall portion 91*a*, a second peripheral wall portion 91*b*, and a partition wall portion 91*c*.

The first peripheral wall portion 91*a* is formed so as to cover the outer side of the rotating electric machine 1 in the radial direction R. The second peripheral wall portion 91*b* is formed so as to cover the outer side of the planetary gear mechanism 31 and the differential gear mechanism 4 in the radial direction R. The partition wall portion 91*c* is formed so as to separate the internal space of the first peripheral wall portion 91*a* and the internal space of the second peripheral wall portion 91*b* in the axial direction L. In the present embodiment, the first peripheral wall portion 91*a* is disposed on the axial first side L1 with respect to the partition wall portion 91*c*, and the second peripheral wall portion 91*b* is disposed on the axial second side L2 with respect to the partition wall portion 91*c*. The first peripheral wall portion 91*a* is formed in a tubular shape opened to the axial first side L1, and the second peripheral wall portion 91*b* is formed in a tubular shape opened to the axial second side L2.

The second case portion 92 includes a first sidewall portion 92*a*. The first sidewall portion 92*a* is formed so as to cover the axial first side L1 of the rotating electric machine 1. In the present embodiment, the second case portion 92 is joined to the first case portion 91 from the axial first side L1 such that the opening of the first peripheral wall portion 91*a* on the axial first side L1 is closed by the first sidewall portion 92*a*.

The third case portion 93 includes a second sidewall portion 93*a*. The second sidewall portion 93*a* is formed so as to cover the axial second side L2 of the power transmission mechanism 3 and the differential gear mechanism 4. In the present embodiment, the third case portion 93 is joined to the first case portion 91 from the axial second side L2 such that the opening of the second peripheral wall portion 91*b* on the axial second side L2 is closed by the second sidewall portion 93*a*.

As illustrated in FIG. 1, the stator 11 of the rotating electric machine 1 includes a cylindrical stator core 11*a*. The stator core 11*a* is fixed to a non-rotating member NR. In the present embodiment, the stator core 11*a* is fixed to the first peripheral wall portion 91*a* of the case 9 serving as the non-rotating member NR. The rotor 12 of the rotating electric machine 1 includes a cylindrical rotor core 12*a*. The rotor core 12*a* is rotatably supported to the stator core 11*a*. In the present embodiment, the rotor 12 further includes a rotor shaft 12*b* connected to the rotor core 12*a* so as to rotate integrally therewith.

In the present embodiment, the rotating electric machine 1 is an inner rotor type rotating electric machine. Therefore, the rotor core 12*a* is disposed on the inner side of the stator core 11*a* in the radial direction R. Furthermore, the rotor shaft 12*b* is disposed on the inner side of the rotor core 12*a* in the radial direction R.

Moreover, in the present embodiment, the rotating electric machine 1 is a rotating field type rotating electric machine. Therefore, a stator coil is wound around the stator core 11*a*. In the present embodiment, the stator coil is wound around the stator core 11*a* such that a pair of coil end portions 11*b* is formed, the coil end portions protruding to both sides in the axial direction L with respect to the stator core 11*a*. Furthermore, although not illustrated, the rotor core 12*a* is provided with a permanent magnet.

In the present embodiment, the rotor shaft 12*b* is formed in a tubular shape having an axial center along the axial direction L. In addition, in the present embodiment, the rotor shaft 12*b* is disposed so as to protrude from the rotor core 12*a* to both sides in the axial direction L. A portion of the rotor shaft 12*b* protruding from the rotor core 12*a* toward the axial first side L1 is rotatably supported to the first sidewall portion 92*a* of the case 9 via a first rotor bearing B11. Meanwhile, a portion of the rotor shaft 12*b* protruding from the rotor core 12*a* toward the axial second side L2 is rotatably supported to the partition wall portion 91*c* of the case 9 via a second rotor bearing B12.

The planetary gear mechanism 31 is configured to decelerate the rotation of the rotor 12 and transmit the rotation to the first gear 32. The planetary gear mechanism 31 includes a sun gear SG, a carrier CR, and a ring gear RG.

The sun gear SG is connected to the rotor 12 so as to rotate integrally therewith. In the present embodiment, the sun gear SG is connected to the rotor shaft 12*b* via an input shaft 5 so as to rotate integrally with the rotor shaft 12*b*.

The input shaft 5 is formed so as to extend along the axial direction L. In the present embodiment, the input shaft 5 is formed so as to extend from the sun gear SG to the axial first side L1. In the example illustrated in FIG. 1, the input shaft 5 is formed integrally with the sun gear SG.

In the present embodiment, the input shaft 5 includes a connecting portion 51 and an enlarged diameter portion 52. The connecting portion 51 is connected to the rotor shaft 12*b* so as to rotate integrally therewith. In the present embodiment, the connecting portion 51 is disposed so as to penetrate the partition wall portion 91*c* of the case 9 in the axial direction L. The connecting portion 51 is disposed on the inner side of the rotor shaft 12*b* in the radial direction R, and is connected to the rotor shaft 12*b* by spline engagement. The enlarged diameter portion 52 is formed to have a larger diameter than the connecting portion 51. In the present embodiment, the enlarged diameter portion 52 is disposed on the axial second side L2 with respect to the partition wall portion 91*c* A first thrust bearing B3 that supports the input shaft 5 in the axial direction L is disposed between the enlarged diameter portion 52 and the partition wall portion 91*c* in the axial direction L.

In the present embodiment, the carrier CR rotatably supports a first pinion gear PG1 and a second pinion gear PG2 that rotate integrally with each other. The first pinion gear PG1 meshes with the sun gear SG. The second pinion gear PG2 meshes with the ring gear RG. In the present embodiment, the second pinion gear PG2 is formed to have a smaller diameter than the first pinion gear PG1. In the present embodiment, the second pinion gear PG2 is disposed further on the axial first side L1 than the first pinion gear PG1. That is, in the present embodiment, the second pinion gear PG2 is disposed closer to the rotating electric machine 1 side in the axial direction L than the first pinion gear PG1. Each of the first pinion gear PG1 and the second pinion gear PG2 rotates (self-rotates) around its own axial center and rotates (revolves) around the sun gear SG together with the carrier CR. The first pinion gear PG1 and the second pinion gear PG2 are each provided in plural numbers at intervals along the own revolution trajectory of each of the first pinion gear PG1 and the second pinion gear PG2.

In the following description, one of the carrier CR and the ring gear RG is referred to as a "first element E1", and the other is referred to as a "second element E2".

The first element E1 is connected to the first gear 32 so as to rotate integrally therewith. In the present embodiment, the carrier CR is connected to the first gear 32 so as to rotate integrally therewith. That is, in the present embodiment, the carrier CR is the first element E1.

The second element E2 is fixed to the non-rotating member NR. In the present embodiment, the ring gear RG is fixed to the second peripheral wall portion 91*b* of the case 9 serving as the non-rotating member NR. That is, in the present embodiment, the ring gear RG is the second element E2.

As described above, in the present embodiment, the ring gear RG is fixed to the non-rotating member NR, and the second pinion gear PG2 is disposed closer to the rotating electric machine 1 side in the axial direction L than the first pinion gear PG1.

In general, a support member as the non-rotating member NR is often provided between the rotating electric machine 1 and the planetary gear mechanism 31 in the axial direction L in order to rotatably support the rotor 12. According to the present configuration, the ring gear RG meshing with the second pinion gear PG2 disposed relatively close to the rotating electric machine 1 can be easily fixed to the non-rotating member NR. This allows a configuration to be easily realized in which the ring gear RG is fixed to the non-rotating member NR while the dimension of the drive device for vehicle 100 in the axial direction L is suppressed small.

In the present embodiment, the first element E1 includes a first connecting portion 311. The first gear 32 includes a second connecting portion 321. The first connecting portion 311 and the second connecting portion 321 are configured to be connected to each other so as to be relatively non-rotatable. In the present embodiment, the first connecting portion 311 is formed in a tubular shape with the first axis X1 as an axial center. The first connecting portion 311 includes a first engaging portion 311*a* and a first pressure contact portion 311*b*. In addition, in the present embodiment, the second connecting portion 321 is disposed on the inner side of the first connecting portion 311 in the radial direction R. The second connecting portion 321 includes a second engaging portion 321*a* and a second pressure contact portion 321*b*.

The first engaging portion 311*a* and the second engaging portion 321*a* are formed to be engaged with each other so as to be relatively non-rotatable. In the present embodiment, the first engaging portion 311*a* includes a plurality of internal teeth extending in the axial direction L and disposed in the circumferential direction around the first axis X1. The second engaging portion 321*a* includes a plurality of external teeth extending in the axial direction L and disposed in the circumferential direction around the first axis X1.

The first pressure contact portion 311*b* and the second pressure contact portion 321*b* are formed to be in pressure contact with each other so as to be relatively immovable in the radial direction R. In the present embodiment, the inner peripheral surface of the first pressure contact portion 311*b* and the outer peripheral surface of the second pressure contact portion 321*b* are formed to be in pressure contact with each other (in other words, in contact with each other with pressure). In the present example, the second pressure contact portion 321*b* is press-fitted into the first pressure contact portion 311*b* or fitted thereto without a gap. Further, in the present embodiment, the first pressure contact portion 311*b* is disposed further on the axial second side L2 than the first engaging portion 311*a* The second pressure contact portion 321*b* is disposed further on the axial second side L2 than the second engaging portion 321*a*

In the present embodiment, the planetary gear mechanism 31 is disposed on the axial second side L2 of the rotating electric machine 1 and on the axial first side L1 of the first gear 32. That is, in the present embodiment, the rotor 12, the planetary gear mechanism 31, and the first gear 32 are disposed on the first axis X1 in the described order from the axial first side L1 toward the axial second side L2.

In the present embodiment, the rotating electric machine 1 has a larger diameter than the planetary gear mechanism 31. In the example illustrated in FIG. 1, the outer peripheral surface of the stator core 11*a* of the rotating electric machine 1 is located on the outer side in the radial direction R with respect to a portion of the ring gear RG of the planetary gear mechanism 31 located on the outermost side in the radial direction R. In addition, in the present embodiment, the first gear 32 has a smaller diameter than the planetary gear mechanism 31. In the example illustrated in FIG. 1, a portion of the first gear 32 located on the outermost side in the radial direction R is located further on the inner side in the radial direction R than the portion of the ring gear RG of the planetary gear mechanism 31 located on the outermost side in the radial direction R. As described above, the planetary gear mechanism 31 has a smaller diameter than the rotating electric machine 1 and a larger diameter than the first gear 32. Therefore, in the present embodiment, the rotating electric machine 1, the planetary gear mechanism 31, and the first gear 32 are disposed on the first axis X1 such that the dimension in the radial direction R gradually decreases from the axial first side L1 toward the axial second side L2.

In the present embodiment, the first gear 32 is rotatably supported to the case 9 via a first support bearing B2. The first support bearing B2 is disposed on the inner side of the first gear 32 in the radial direction R and at a position overlapping the first gear 32 in radial direction view along the radial direction R. Here, regarding the disposition of two elements, "overlapping in specific direction view" means that when a virtual straight line parallel to the line-of-sight direction is moved in each direction orthogonal to the virtual straight line, a region where the virtual straight line intersects both of the two elements exists in at least a part of the movement.

In the present embodiment, the second sidewall portion 93*a* of the case 9 is disposed adjacent to the first gear 32 on the axial second side L2. In the present embodiment, the second sidewall portion 93*a* corresponds to a "support wall portion SW" disposed adjacent to the first gear 32 on the opposite side to the planetary gear mechanism 31 side in the axial direction L.

In addition, in the present embodiment, the second sidewall portion 93*a* is formed with a first protruding portion 93*b* protruding toward the axial first side L1. In the present embodiment, the first protruding portion 93*b* is formed to support the first support bearing B2 from the inner side in the radial direction R. As described above, in the present embodiment, the first protruding portion 93*b* functions as a "bearing support portion SWa" that supports the first support bearing B2 from the inner side in the radial direction R.

In the present embodiment, the first gear 32 further includes a supported portion 322. The supported portion 322 is disposed between the input shaft 5 and the first protruding portion 93*b* of the case 9 in the axial direction L. In the present embodiment, the supported portion 322 is formed to protrude inward in the radial direction R from the second connecting portion 321.

In the present embodiment, a second thrust bearing B4 is disposed between the supported portion 322 and the input shaft 5 in the axial direction L. A third thrust bearing B5 is disposed between the supported portion 322 and the first protruding portion 93*b* in the axial direction L. Thus, in the present embodiment, the first gear 32 is supported to the case 9 in the axial direction L by the second thrust bearing B4 and the third thrust bearing B5.

The second gear 33 meshes with the first gear 32. The second gear 33 is connected to the output member 2 so as to rotate integrally therewith. In the present embodiment, the second gear 33 is formed to have a larger diameter than the first gear 32. Therefore, in the present embodiment, the rotation of the first element E1 (here, the carrier CR) is decelerated between the first gear 32 and the second gear 33 and transmitted to the output member 2.

In the present embodiment, the second gear 33 is rotatably supported to the case 9 via a second support bearing B6. The second support bearing B6 is disposed on the inner side of the second gear 33 in the radial direction R and at a position overlapping the second gear 33 in radial direction view along the radial direction R.

In the present embodiment, the second sidewall portion 93*a* is formed with a second protruding portion 93*c* protruding toward the axial first side L1. In the present embodiment, the second protruding portion 93*c* is formed to support the second support bearing B6 from the inner side in the radial direction R.

In the present embodiment, each of the first gear 32 and the second gear 33 is a double helical gear. More specifically, the first gear 32 includes a first meshing portion 32*a* and a second meshing portion 32*b* in which the helix directions of the tooth portions are different from each other. Furthermore, the second gear 33 includes a third meshing portion 33*a* and a fourth meshing portion 33*b* in which the helix directions of the tooth portions are different from each other. The first meshing portion 32*a* and the third meshing portion 33*a* mesh with each other, and the second meshing portion 32*b* and the fourth meshing portion 33*b* mesh with each other. Here, "a helix direction of a tooth portion" is a direction in which the tooth portion of a target gear is inclined with respect to the axial center of the target gear.

According to this configuration, as compared with a configuration in which the first gear 32 and the second gear 33 are simply helical gears, the thrust force generated by the meshing between the first gear 32 and the second gear 33 can be reduced. This can simplify the support structure of the first gear 32 and the second gear 33. Therefore, the drive device for vehicle 100 can be easily downsized.

In the present embodiment, the differential gear mechanism 4 includes a differential case 41, a pair of pinion gears 42, a first side gear 43, and a second side gear 44. Here, the pair of pinion gears 42, the first side gear 43, and the second side gear 44 are all bevel gears.

The differential case 41 is a hollow member in which the pair of pinion gears 42, and the first side gear 43 and the second side gear 44 are housed. The differential case 41 is connected to the second gear 33 so as to rotate integrally therewith. Therefore, in the present embodiment, the differential case 41 corresponds to the output member 2.

In the present embodiment, the differential case 41 is rotatably supported to the case 9 via a differential bearing B7. In the example illustrated in FIG. 1, the differential case 41 has an end on the axial first side L1 rotatably supported to the second peripheral wall portion 91*b* of the case 9 via the differential bearing B7.

The pair of pinion gears 42 is disposed so as to face each other with a space provided therebetween in the radial direction R with reference to the second axis X2. The pair of pinion gears 42 is attached to a pinion shaft 42*a* supported so as to rotate integrally with the differential case 41. Each of the pair of pinion gears 42 is configured to be rotatable (self-rotatable) about the pinion shaft 42*a* and to be rotatable (revolvable) about the second axis X2.

The first side gear 43 and the second side gear 44 mesh with the pair of pinion gears 42. The first side gear 43 and the second side gear 44 are disposed so as to rotate about the second axis X2 as a rotation axis. The first side gear 43 is disposed on the axial first side L1 with respect to the pinion shaft 42*a*. The second side gear 44 is disposed on the axial second side L2 with respect to the pinion shaft 42*a*.

In the present embodiment, the first side gear 43 is connected to a first drive shaft DS1 (see FIG. 2) so as to rotate integrally therewith, with a transmission shaft 6 extending along the axial direction L interposed therebetween, the first drive shaft DS1 being drivingly connected to the wheel W on the axial first side L1. In the example illustrated in FIG. 1, the transmission shaft 6 is inserted to the first side gear 43 on the inner side in the radial direction R from the axial first side L1, and the two are connected to each other by spline engagement. As illustrated in FIG. 2, defining that one of the pair of wheels W disposed on the axial first side L1 is a target wheel WT, the differential gear mechanism 4 is connected to the target wheel WT with the transmission shaft 6 interposed therebetween. In the present embodiment, the transmission shaft 6 corresponds to a "connecting member".

The transmission shaft 6 is disposed on the second axis X2. In the present embodiment, the transmission shaft 6 is disposed so as to pass through the outer side of the rotating electric machine 1 in the radial direction R inside the case 9 and penetrate the first sidewall portion 92*a* in the axial direction L. The transmission shaft 6 is connected to the first drive shaft DS1 (see FIG. 2) so as to rotate integrally therewith. In the example illustrated in FIG. 1, a portion of the transmission shaft 6 further on the axial first side L1 than the first case portion 91 is formed in a tubular shape opening to the axial first side L1. The first drive shaft DS1 is inserted to this tubular portion of the transmission shaft 6 on the inner side in the radial direction R from the axial first side L1, and the two are connected to each other by spline engagement.

In the present embodiment, the second side gear 44 is connected to a second drive shaft DS2 (see FIG. 2) so as to rotate integrally therewith, the second drive shaft DS2 being drivingly connected to the wheel W on the axial second side L2. In the example illustrated in FIG. 1, the second drive shaft DS2 is inserted to the second side gear 44 on the inner side in the radial direction R from the axial second side L2, and the two are connected to each other by spline engagement.

In the present embodiment, the differential gear mechanism 4 is disposed on the axial first side L1 of the second gear 33 and on the axial second side L2 of the transmission shaft 6. That is, in the present embodiment, the transmission shaft 6, the differential gear mechanism 4, and the second gear 33 are disposed on the second axis X2 parallel to the first axis X1 in the described order from the axial first side L1 toward the axial second side L2.

In the present embodiment, the second gear 33 has a larger diameter than the differential gear mechanism 4. In the example illustrated in FIG. 1, a portion of the second gear 33 located on the outermost side in the radial direction R is located further on the outer side in the radial direction R than the portion of the pinion gear 42 of the differential gear mechanism 4 located on the outermost side in the radial direction R. In addition, the transmission shaft 6 has a smaller diameter than the differential gear mechanism 4. In the example illustrated in FIG. 1, a portion of the transmission shaft 6 located on the outermost side in the radial direction R is located further on the inner side in the radial direction R than the portion of the pinion gear 42 of the differential gear mechanism 4 located on the outermost side in the radial direction R. As described above, the differential gear mechanism 4 has a smaller diameter than the second gear 33 and a larger diameter than the transmission shaft 6. Therefore, in the present embodiment, transmission shaft 6, the differential gear mechanism 4, and the second gear 33 are disposed on the second axis X2 such that the dimension in the radial direction R gradually increases from the axial first side L1 toward the axial second side L2.

Figure 3:
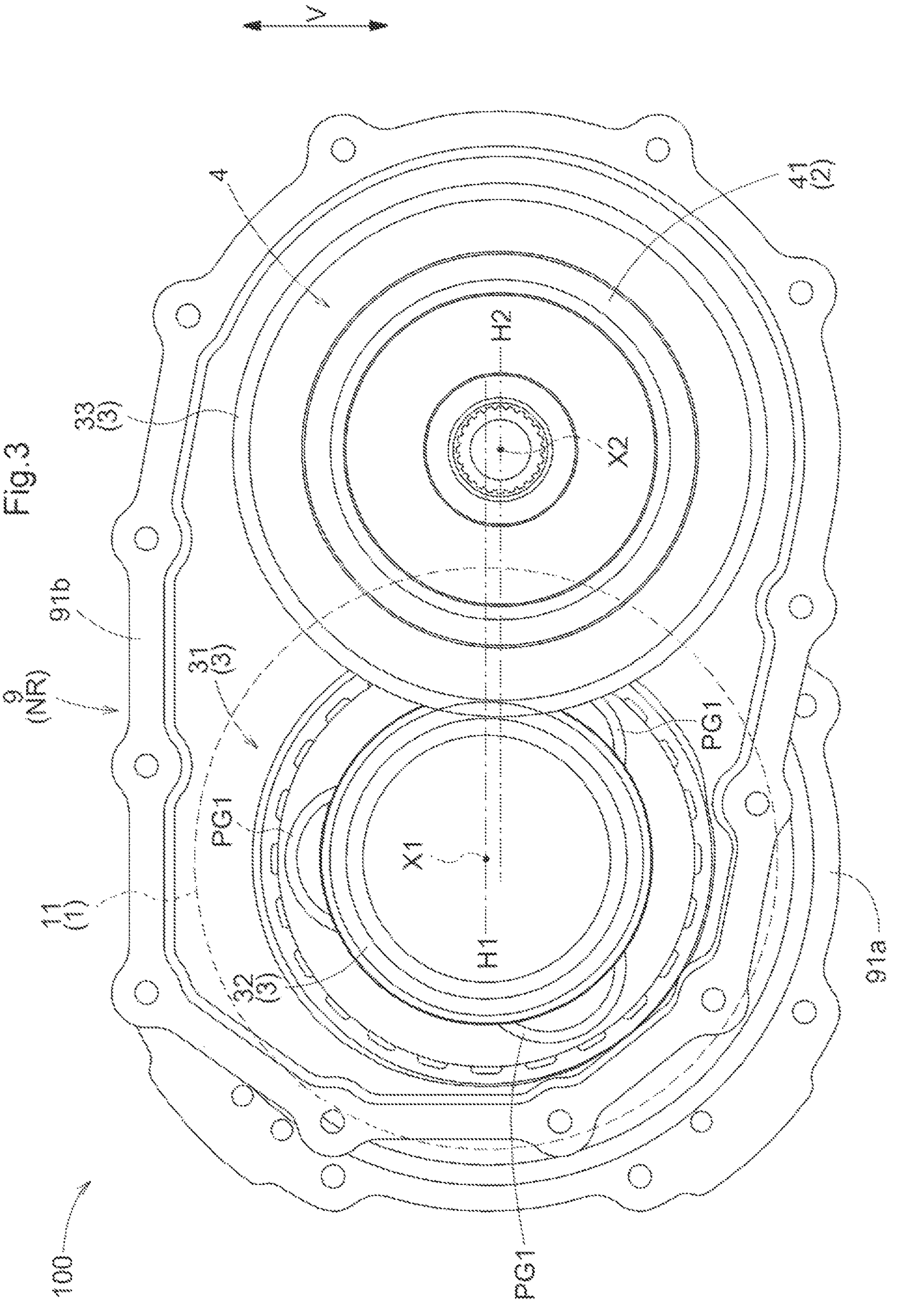
FIG. 3 is a diagram illustrating a positional relationship of each element in axial direction view in the drive device for vehicle according to the first embodiment.

FIG. 3 illustrates a positional relationship of each element housed in the case 9 in axial direction view along the axial direction L. Note that a reference sign "V" in FIG. 3 indicates the vertical direction of the drive device for vehicle 100 in a vehicle mounting attitude. Here, the "vehicle mounting attitude" is a posture of the drive device for vehicle 100 in a state of being mounted on a vehicle.

As illustrated in FIG. 3, in the present embodiment, the first axis X1 is disposed on the upper side of the second axis X2 in the vehicle mounting attitude. Note that a reference sign "H1" in FIG. 3 indicates a virtual plane passing through the first axis X1 along the horizontal direction (direction orthogonal to the vertical direction V). Further, a reference sign "H2" in FIG. 3 indicates a virtual plane passing through the second axis X2 along the horizontal direction (direction orthogonal to the vertical direction V).

As described above, the drive device for vehicle 100 of the present embodiment includes:

the rotating electric machine 1 including the rotor 12;

the output member 2 drivingly connected to the wheels W included in a vehicle; and the power transmission mechanism 3 that transmits rotation of the rotor 12 to the output member 2, in which the power transmission mechanism 3 includes the planetary gear mechanism 31, the first gear 32, and the second gear 33, the planetary gear mechanism 31 includes the sun gear SG, the carrier CR, and the ring gear RG, the sun gear SG is connected to the rotor 12 so as to rotate integrally with the rotor 12, the carrier CR rotatably supports the first pinion gear PG1 and the second pinion gear PG2 that rotate integrally with each other, one of the carrier CR and the ring gear RG is connected to the first gear 32 so as to rotate integrally with the first gear 32, the other of the carrier CR and the ring gear RG is fixed to the non-rotating member NR, the second gear 33 meshes with the first gear 32 and is connected to the output member 2 so as to rotate integrally with the output member 2, the first pinion gear PG1 meshes with the sun gear SG, the second pinion gear PG2 has a smaller diameter than the first pinion gear PG1 and meshes with the ring gear RG, the rotor 12, the planetary gear mechanism 31, and the first gear 32 are disposed on the first axis X1, the output member 2 and the second gear 33 are disposed on the second axis X2 parallel to the first axis X1, and the first axis X1 is disposed on the upper side of the second axis X2 in the vehicle mounting attitude that is an attitude in a state of the rotating electric machine being mounted on the vehicle.

According to this configuration, a two-shaft configuration can be realized in which the rotating electric machine 1, the planetary gear mechanism 31, and the first gear 32, and the output member 2 and the second gear 33, are disposed on different axes from each other. With this configuration, the dimension in the radial direction R of the drive device for vehicle 100 can be suppressed small as compared with a multi-shaft configuration including three or more shafts including, for example, a counter gear mechanism or the like.

In addition, according to the present configuration, the carrier CR of the planetary gear mechanism 31 supports the first pinion gear PG1 and the second pinion gear PG2 having different outer diameters from each other. The sun gear SG that rotates integrally with the rotor 12 meshes with the first pinion gear PG1 having a large diameter. Further, one of the carrier CR and the ring gear RG is connected to the first gear 32 so as to rotate integrally with the first gear 32, and the other of the carrier CR and the ring gear RG is fixed to the non-rotating member NR. The ring gear RG meshes with the second pinion gear PG2 having a small diameter. Therefore, the dimension in the radial direction R of the drive device for vehicle 100 can be suppressed small as compared with the configuration including a counter gear mechanism or the like, and a large reduction ratio can be easily secured. In addition, this also enables even the rotating electric machine 1 of a small size to transmit high torque to the output member 2.

Moreover, according to the present configuration, the first axis X1 as the axial center of the rotating electric machine 1 is disposed on the upper side of the second axis X2 as the axial center of the output member 2. This allows the minimum ground height to be secured in a case where the drive device for vehicle 100 is mounted on the vehicle, even in a case where the outer diameter of the rotating electric machine 1 is formed relatively large.

As described above, according to the present configuration, the drive device for vehicle 100 that can easily secure the minimum ground height in a state of being mounted on the vehicle while a large reduction ratio is ensured can be realized.

As illustrated in FIGS. 1 and 3, in the present embodiment, the second gear 33 has a smaller diameter than the rotating electric machine 1. The second gear 33 and the planetary gear mechanism 31 overlap each other in axial direction view along the axial direction L. In the illustrated example, in axial direction view along the axial direction L, the second gear 33 overlaps both the carrier CR and the ring gear RG of the planetary gear mechanism 31, but does not overlap the sun gear SG.

According to this configuration, the dimension of the second gear 33 in the radial direction R can be suppressed small. In addition, the dimension of the drive device for vehicle 100 in the radial direction R can be suppressed small as compared with a configuration in which the second gear 33 and the planetary gear mechanism 31 are disposed apart from each other in the radial direction R.

As illustrated in FIG. 1, in the present embodiment, a disposition region of the planetary gear mechanism 31 in the axial direction L and a disposition region of the differential gear mechanism 4 in the axial direction L overlap each other. In addition, in the present embodiment, a disposition region of the rotating electric machine 1 in the axial direction L and a disposition region of the transmission shaft 6 in the axial direction L overlap each other. Here, regarding the disposition of two members, "a disposition region in a specific direction overlaps" means that the disposition region in the specific direction of one member includes at least a part of the disposition region in the specific direction of the other member. As illustrated in FIGS. 1 and 3, in the present embodiment, the rotating electric machine 1 and the differential gear mechanism 4 overlap each other in axial direction view along the axial direction L. In the example illustrated in FIG. 1, in axial direction view along the axial direction L, the differential gear mechanism 4 overlaps the stator 11 of the rotating electric machine 1, but does not overlap the rotor 12.

In this way, in the present embodiment, the drive device for vehicle 100 further includes the differential gear mechanism 4 that distributes the torque transmitted to the output member 2 to the pair of wheels W, in which the differential gear mechanism 4 is disposed on the second axis X2, the rotating electric machine 1 has a larger diameter than the planetary gear mechanism 31, the first gear 32 has a smaller diameter than the planetary gear mechanism 31, the second gear 33 has a larger diameter than the differential gear mechanism 4, the disposition region of the planetary gear mechanism 31 in the axial direction L overlaps the disposition region of the differential gear mechanism 4 in the axial direction L, and, in axial direction view along the axial direction L, the rotating electric machine 1 and the differential gear mechanism 4 overlap each other.

According to this configuration, the disposition region in the axial direction L of the planetary gear mechanism 31 formed to have a smaller diameter than the rotating electric machine 1 overlaps the disposition region in the axial direction L of the differential gear mechanism 4 formed to have a smaller diameter than the second gear 33. This allows the inter-axis distance between the first axis X1 as the axial center of the planetary gear mechanism 31 and the second axis X2 as the axial center of the differential gear mechanism 4 to be suppressed short. Therefore, the dimension of the drive device for vehicle 100 in the radial direction R can be suppressed small.

Further, according to the present configuration, the rotating electric machine 1 and the differential gear mechanism 4 overlap each other in axial direction view along the axial direction L. This allows the dimension of the drive device for vehicle 100 in the radial direction R to be suppressed small as compared with a configuration in which the rotating electric machine 1 and the differential gear mechanism 4 are disposed apart from each other in the radial direction R.

As described above, in the present embodiment, in the configuration further including the differential gear mechanism 4, the rotor 12, the planetary gear mechanism 31, and the first gear 32 are disposed on the first axis X1 in the described order from the axial first side L1 toward the axial second side L2, and the differential gear mechanism 4 and the second gear 33 are disposed on the second axis X2 in the described order from the axial first side L1 toward the axial second side L2.

According to this configuration, the rotating electric machine 1, the planetary gear mechanism 31, and the first gear 32 are disposed on the first axis such that the dimension in the radial direction R gradually decreases from the axial first side L1 toward the axial second side L2. Meanwhile, the differential gear mechanism 4 and the second gear 33 are disposed on the second axis X2 such that the dimension in the radial direction R gradually increases from the axial first side L1 toward the axial second side L2. This allows the inter-axis distance between the first axis X1 and the second axis X2 to be suppressed short while the dimension in the radial direction R necessary for each element on the first axis X1 and each element on the second axis X2 is secured. Therefore, the entire structure of the drive device for vehicle 100 can be downsized in the radial direction R.

2. Second Embodiment

Hereinafter, a drive device for vehicle 100 according to a second embodiment is described with reference to FIG. 4. In the present embodiment, the positional relationship between a planetary gear mechanism 31 and a first gear 32 in the axial direction L and the positional relationship between a second gear 33 and a differential gear mechanism 4 in the axial direction L are different from those in the first embodiment. Hereinafter, differences from the first embodiment are mainly described. Note that points not specifically described are the same as those in the first embodiment.

Figure 4:
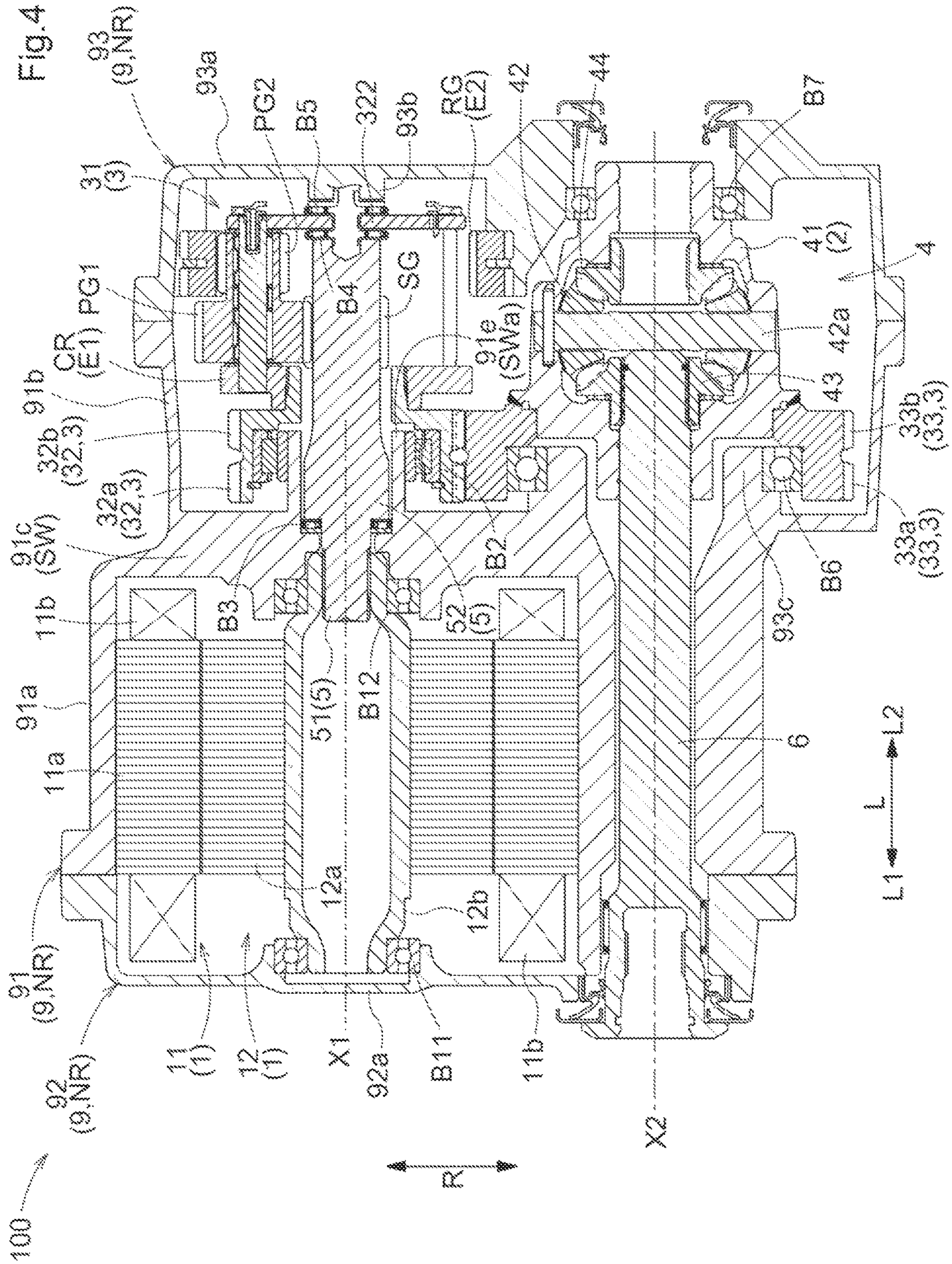
FIG. 4 is a cross-sectional view along the axial direction of a drive device for vehicle according to a second embodiment.

As illustrated in FIG. 4, in the present embodiment, the first gear 32 is disposed on the axial second side L2 of a rotating electric machine 1 and on the axial first side L1 of the planetary gear mechanism 31. That is, in the present embodiment, a rotor 12, the first gear 32, and the planetary gear mechanism 31 are disposed on the first axis X1 in the described order from the axial first side L1 toward the axial second side L2. Further, in the present embodiment, a second pinion gear PG2 is disposed further on the axial second side L2 than a first pinion gear PG1. That is, in the present embodiment, the second pinion gear PG2 is disposed closer to the opposite side to the rotating electric machine 1 side in the axial direction L than the first pinion gear PG1.

In the present embodiment, a partition wall portion 91*c* of a case 9 is disposed adjacent to the first gear 32 on the axial first side L1. As described above, in the present embodiment, the partition wall portion 91*c* corresponds to a "support wall portion SW" disposed adjacent to the first gear 32 on the opposite side to the planetary gear mechanism 31 side in the axial direction L.

In addition, in the present embodiment, the partition wall portion 91*c* is formed with a third protruding portion 91*e* protruding toward the axial second side L2. In the present embodiment, the third protruding portion 91*e* is formed in a tubular shape that covers the outer side of an input shaft 5 in the radial direction R. Further, in the present embodiment, the third protruding portion 91*e* is formed to support a first support bearing B2 from the inner side in the radial direction R. As described above, in the present embodiment, the third protruding portion 91*e* corresponds to a "bearing support portion SWa" that supports the first support bearing B2 from the inner side in the radial direction R. Note that, in the present embodiment, a first protruding portion 93*b* is formed on a second sidewall portion 93*a*, but does not function as the bearing support portion SWa.

In the present embodiment, a carrier CR of the planetary gear mechanism 31 includes a supported portion 322. In the example illustrated in FIG. 4, the supported portion 322 is formed so as to protrude inward in the radial direction R from a portion of the carrier CR further on the axial second side L2 than the second pinion gear PG2. Note that, in the present embodiment, the first gear 32 does not include a supported portion 322.

In the present embodiment, the partition wall portion 91*c* is formed with a second protruding portion 93*c* that supports a second support bearing B6 from the inner side in the radial direction R. In the present embodiment, a differential bearing B7 that supports a differential case 41 is attached to the second sidewall portion 93*a*.

3. Third Embodiment

Hereinafter, a drive device for vehicle 100 according to a third embodiment is described with reference to FIG. 5. The present embodiment is different from the first embodiment in that a ring gear RG is a first element E1 and a carrier CR is a second element E2. Hereinafter, differences from the first embodiment are mainly described. Note that points not specifically described are similar to those in the first embodiment.

Figure 5:
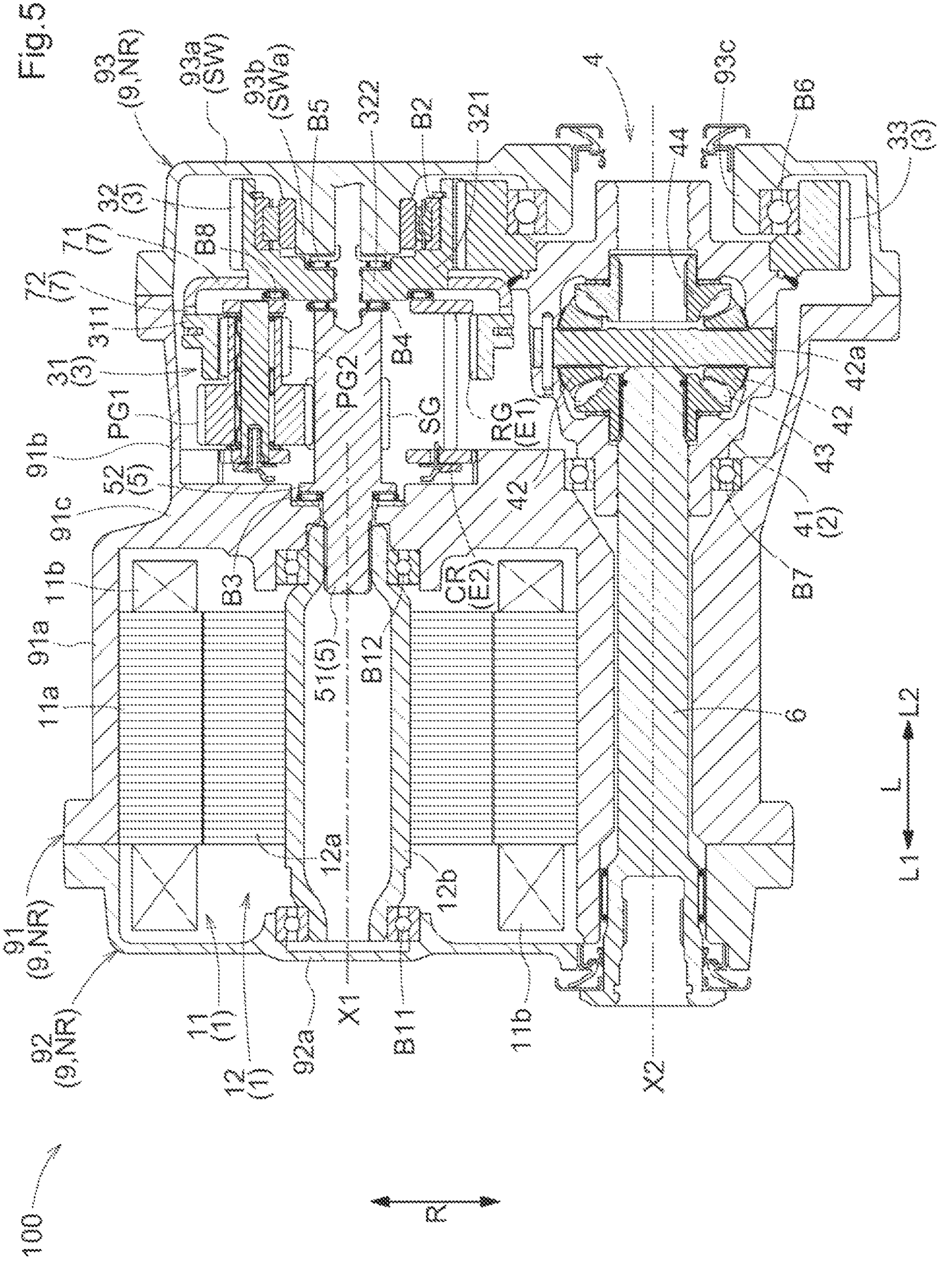
FIG. 5 is a cross-sectional view along the axial direction of a drive device for vehicle according to a third embodiment.

As illustrated in FIG. 5, the ring gear RG is connected to a first gear 32 so as to rotate integrally therewith. That is, in the present embodiment, the ring gear RG is the first element E1. In this example, the ring gear RG is connected to the first gear 32 via a connecting member 7 so as to rotate integrally with the first gear 32.

The connecting member 7 includes a radially extending portion 71 formed so as to extend along the radial direction R with reference to the first axis X1 and an axially extending portion 72 formed so as to extend along the axial direction L. In this example, an inner end of the radially extending portion 71 in the radial direction R is connected to a second connecting portion 321 of the first gear 32 by welding. The radially extending portion 71 and the axially extending portion 72 are integrally formed so as to connect an outer end in the radial direction R of the radially extending portion 71 to an end on the axial second side L2 of the axially extending portion 72.

Further, in the present example, a plurality of claw portions protruding toward the axial first side L1 are disposed in the circumferential direction about the first axis X1 at an end of the axially extending portion 72 on the axial first side L1. In a first connecting portion 311 of the ring gear RG as the first element E1, a plurality of claw portions protruding outward in the radial direction R are disposed in the circumferential direction about the first axis X1. The plurality of claw portions in the axially extending portion 72 are engaged with the plurality of claw portions in the first connecting portion 311 of the ring gear RG from the axial second side L2. The plurality of claw portions in the axially extending portion 72 and the plurality of claw portions in the first connecting portion 311 of the ring gear RG are fixed by, for example, an annular fixing member so as not to move relative to each other in the axial direction L. Note that the above claw portions may be formed such that the axially extending portion 72 relatively moves in the radial direction R with respect to the first connecting portion 311 of the ring gear RG, or may be formed such that the claw portions are relatively immovable thereto.

Further, in the present embodiment, a second pinion gear PG2 is disposed further on the axial second side L2 than a first pinion gear PG1. That is, in the present embodiment, the second pinion gear PG2 is disposed closer to the opposite side to the rotating electric machine 1 side in the axial direction L than the first pinion gear PG1.

In the present embodiment, a fourth thrust bearing B8 is disposed between a portion of the carrier CR further on the axial second side L2 than the second pinion gear PG2 and the second connecting portion 321 of the first gear 32 in the axial direction L. The fourth thrust bearing B8 supports the carrier CR and the first gear 32 in the axial direction L such that the carrier CR and the first gear 32 rotate relative to each other.

Further, in the present embodiment, each of the first gear 32 and the second gear 33 is a helical gear, and not a double helical gear. Note that each of the first gear 32 and the second gear 33 may be a spur gear.

4. Fourth Embodiment

Hereinafter, a drive device for vehicle 100 according to a fourth embodiment is described with reference to FIGS. 6 to 8. Hereinafter, differences from the first embodiment are mainly described. Points not specifically described are similar to those in the first embodiment.

Figure 6:
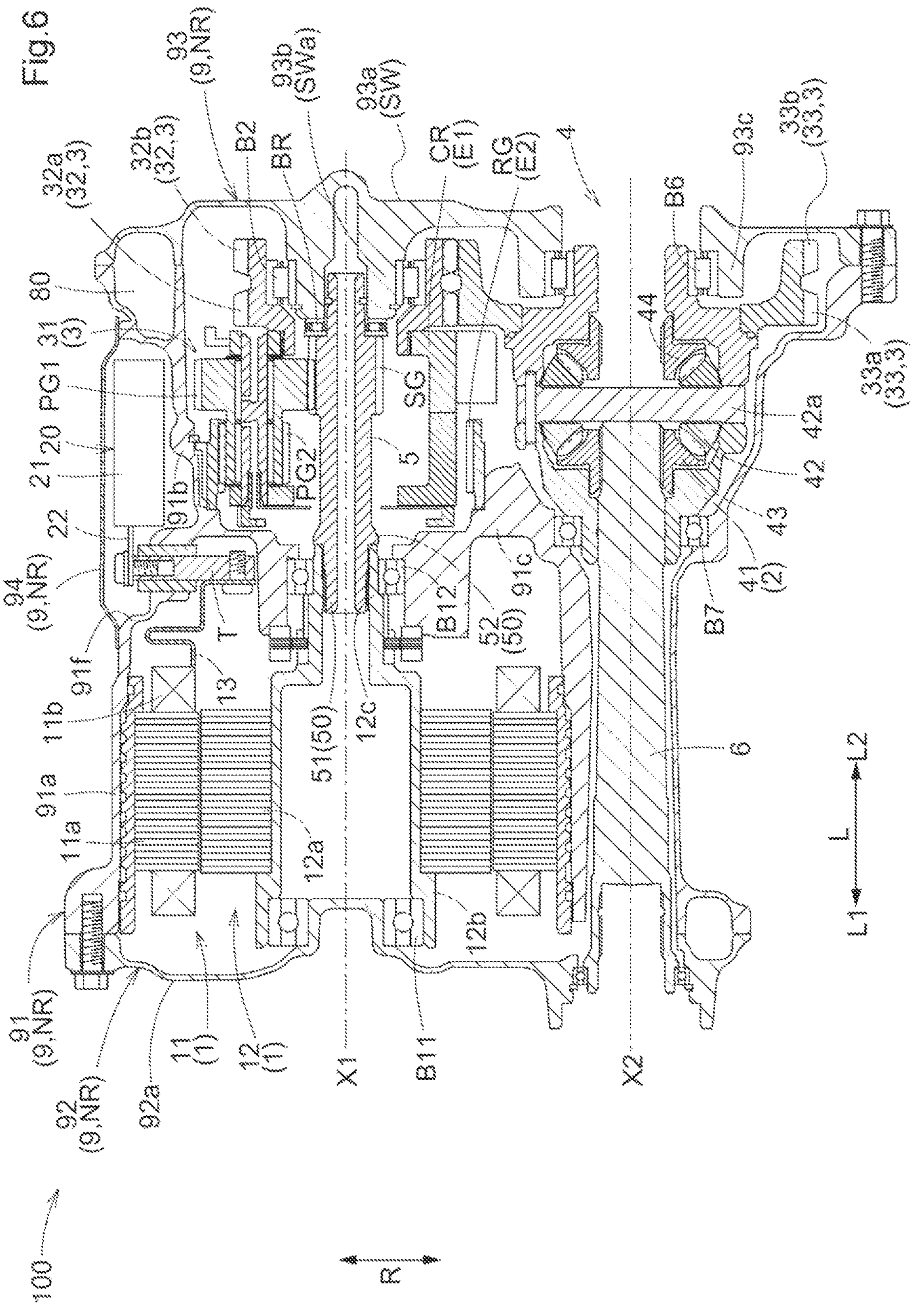
FIG. 6 is a cross-sectional view along the axial direction of a drive device for vehicle according to a fourth embodiment.

As illustrated in FIG. 6, in the present embodiment, at a connecting portion between an input shaft 5 (specifically, an end 50 on the axial first side L1 of the input shaft 5) and a rotor shaft 12*b* (specifically, an end 12*c* on the axial second side L2 of the rotor shaft 12*b*), an enlarged diameter portion 52 is disposed so as to abut on the rotor shaft 12*b* (specifically, an end surface on the axial second side L2 of the rotor shaft 12*b*) from the axial second side L2, and the load facing the axial first side L1 and generated in a sun gear SG is transmitted to the rotor shaft 12*b* and supported by a first rotor bearing B11. Further, in the present embodiment, a fifth thrust bearing BR that supports the input shaft 5 in the axial direction L is disposed between the input shaft 5 and a first protruding portion 93*b* in the axial direction L, and the load generated in the sun gear SG and facing the axial second side L2 is supported by the fifth thrust bearing BR.

The drive device for vehicle 100 includes an inverter device 20 that drives and controls a rotating electric machine 1. In the present embodiment, as illustrated in FIG. 6, a case 9 houses the inverter device 20. Specifically, the case 9 includes a housing chamber forming portion 91*f* that forms a housing chamber of the inverter device 20, and a fourth case portion 94 joined to the housing chamber forming portion 91*f* so as to close the opening of the housing chamber. That is, the inverter device 20 is housed in a space surrounded by the housing chamber forming portion 91*f* and the fourth case portion 94. In the present embodiment, a first case portion 91 includes the housing chamber forming portion 91*f*.

Figure 8:
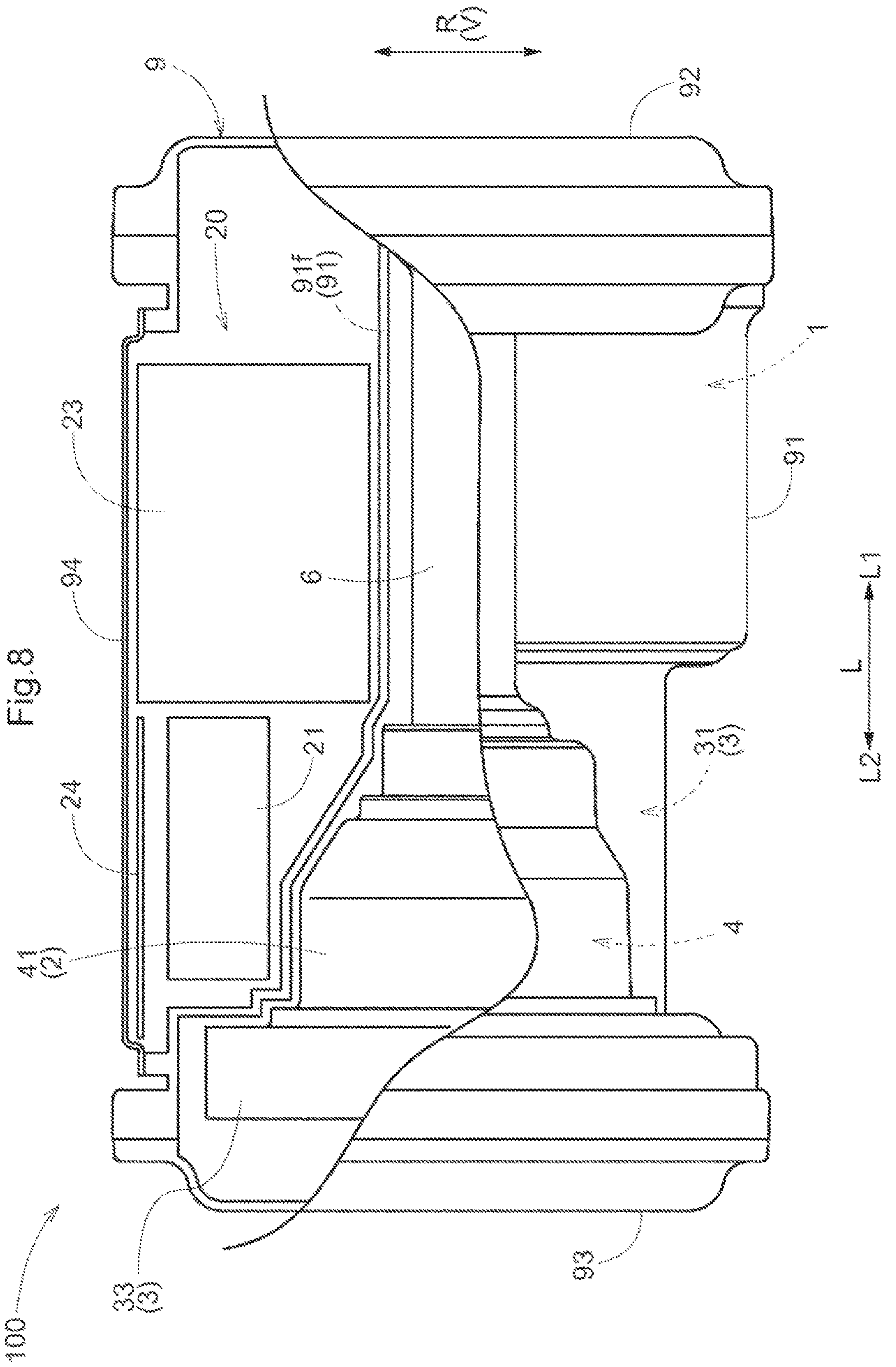
FIG. 8 is a view of the drive device for vehicle according to the fourth embodiment as viewed in a horizontal direction orthogonal to the axial direction.

As illustrated in FIGS. 6 and 8, the inverter device 20 includes a power module 21 in which a plurality of elements (switching elements and the like) constituting an inverter circuit are modularized, an output bus bar 22 for outputting AC power from the power module 21, a capacitor 23 for smoothing a voltage between positive and negative electrodes on a DC side of the inverter circuit, and a control board 24 on which a control device for controlling the inverter circuit is mounted. As illustrated in FIG. 6, the output bus bar 22 is electrically connected to a power line 13 drawn out from a coil end portion 11*b* via a terminal block T. Note that FIG. 8 illustrates different portions offset in the horizontal direction (horizontal direction orthogonal to the axial direction L) on the upper side and the lower side. Further, one direction in the radial direction R coincides with the vertical direction V, and FIG. 8 illustrates the radial direction R coinciding with the vertical direction V.

As illustrated in FIG. 8, in the present embodiment, at least a part of the inverter device 20 (here, at least the power module 21) is disposed on the outer side in the radial direction of a differential gear mechanism 4. In other words, the power module 21 is disposed on the outer side of the differential gear mechanism 4 in the radial direction R and at a position overlapping the differential gear mechanism 4 in radial direction view along the radial direction R. Further, in the present embodiment, the power module 21 is disposed on the upper side (upper side in the vertical direction V in the vehicle mounting attitude, the same applies hereinafter) of the differential gear mechanism 4. Specifically, the power module 21 is disposed on the upper side of the differential gear mechanism 4 and at a position overlapping the differential gear mechanism 4 in vertical direction view along the vertical direction V As illustrated in FIG. 8, in the present embodiment, at least a part of the inverter device 20 (here, at least the capacitor 23) is disposed on the outer side in the radial direction of a transmission shaft 6. Specifically, the capacitor 23 is disposed on the outer side of the transmission shaft 6 in the radial direction R and at a position overlapping the transmission shaft 6 in radial direction view along the radial direction R. In addition, in the present embodiment, the capacitor 23 is disposed on the upper side of the transmission shaft 6. Specifically, the capacitor 23 is disposed on the upper side of the transmission shaft 6 and at a position overlapping the transmission shaft 6 in vertical direction view along the vertical direction V.

Although at least a part of the output bus bar 22 is illustrated in FIG. 6, at least a part of the inverter device 20 (here, at least the output bus bar 22) is disposed on the outer side in the radial direction of a planetary gear mechanism 31. Specifically, the output bus bar 22 is disposed on the outer side of the planetary gear mechanism 31 in the radial direction R and at a position overlapping the planetary gear mechanism 31 in radial direction view along the radial direction R. In addition, in the present embodiment, the output bus bar 22 is disposed on the upper side of the planetary gear mechanism 31. Specifically, the output bus bar 22 is disposed on the upper side of the planetary gear mechanism 31 and at a position overlapping the planetary gear mechanism 31 in vertical direction view along the vertical direction V.

Figure 7:
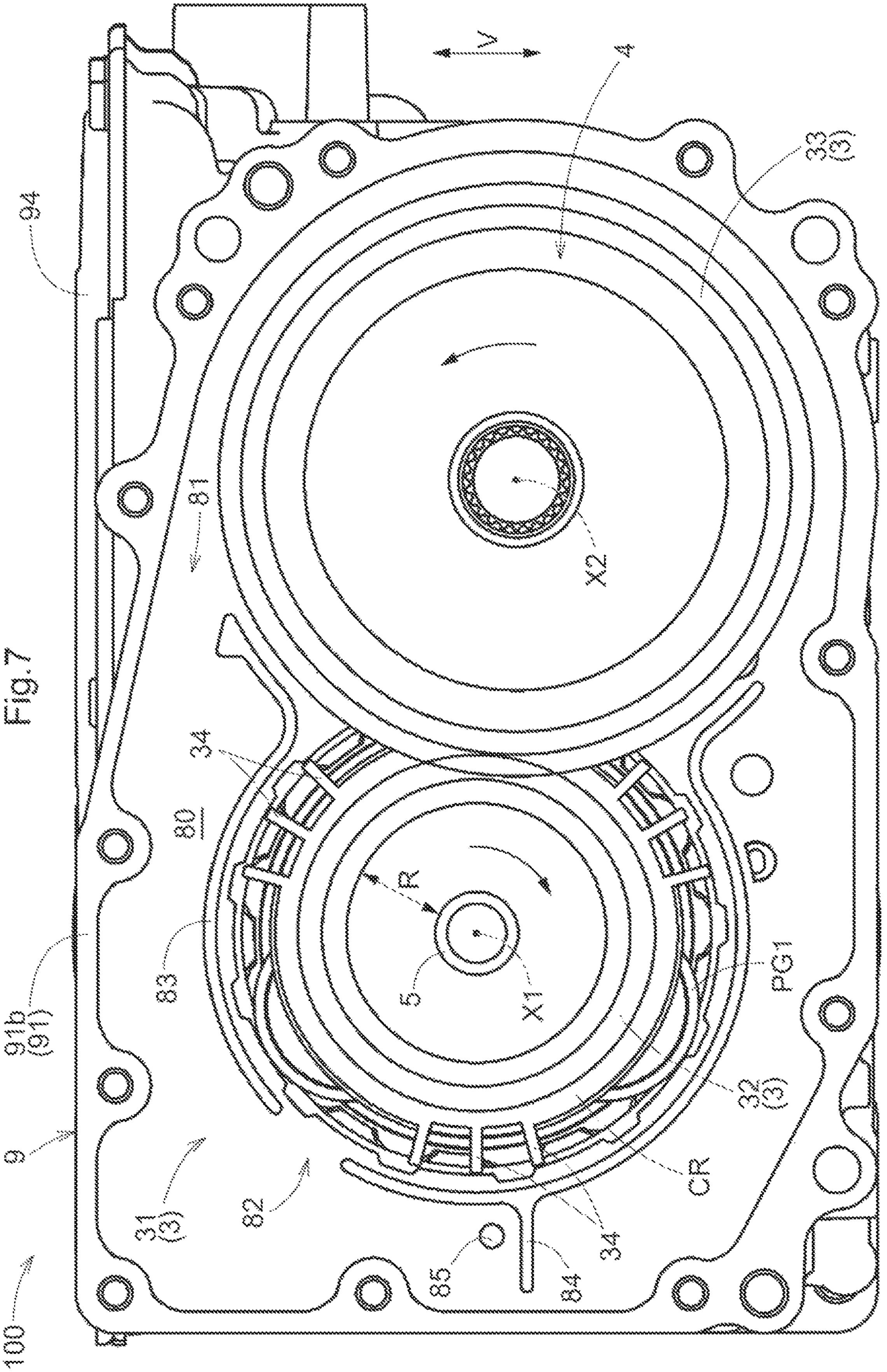
FIG. 7 is a view of the inside of a case of the drive device for vehicle according to the fourth embodiment as viewed from an axial second side.

As illustrated in FIGS. 6 and 7, the drive device for vehicle 100 includes a catch tank 80 that stores oil scraped up by the planetary gear mechanism 31 or a second gear 33. In the present embodiment, the oil scraped up by the planetary gear mechanism 31 (here, projecting portions 34 provided in a carrier CR, see FIG. 7) is stored in the catch tank 80, and the oil scraped up by the second gear 33 is stored therein. The case 9 houses therein oil for lubricating (including cooling) the rotating electric machine 1 and a power transmission mechanism 3, and the catch tank 80 temporarily stores the oil in the case 9. The catch tank 80 is connected with an oil passage, such as an oil passage 85 illustrated in FIG. 7, for supplying oil to a lubrication target location such as a bearing or a rotating shaft, and the oil in the catch tank 80 is supplied to the lubrication target location via the oil passage.

In the present embodiment, the catch tank 80 is disposed on the outer side in the radial direction of a first gear 32. Specifically, the catch tank 80 is disposed on the outer side of the first gear 32 in the radial direction R and at a position overlapping the first gear 32 in radial direction view along the radial direction R.

In the example shown in FIG. 7, the catch tank 80 is formed in a region surrounded by a division wall 83 disposed along the outer periphery of the planetary gear mechanism 31 and the inner surface of the case 9. The catch tank 80 includes a first introducing port 81 that opens toward the second gear 33 side, and the oil scraped up by the second gear 33 rotating in a direction indicated by an arrow in the drawing is introduced into the catch tank 80 from the first introducing port 81. In the illustrated example, a weir portion 84 for guiding the oil stored in the catch tank 80 to the oil passage 85 is provided so as to protrude outward in the radial direction R from the division wall 83. Although not illustrated, in the present example, the division wall 83 (specifically, a portion of the division wall 83 disposed along the outer periphery of the planetary gear mechanism 31) is disposed on the inner side in the radial direction R of the outer peripheral surface of a stator core 11*a* of the rotating electric machine 1.

In the example illustrated in FIG. 7, the catch tank 80 includes a second introducing port 82 in addition to the first introducing port 81. In a state where the second gear 33 and the carrier CR rotate in a direction opposite to the direction indicated by the arrow in the figure, the oil scraped up by the planetary gear mechanism 31 (here, the projecting portions 34 provided on the carrier CR) is introduced from the second introducing port 82 into the catch tank 80. In the illustrated example, the second introducing port 82 is formed so as to penetrate the division wall 83 in the radial direction R.

5. Other Embodiments (1) In the above embodiment, the configuration in which the planetary gear mechanism 31 is a planetary gear mechanism (double pinion planetary gear mechanism) including the first pinion gear PG1 and the second pinion gear PG2 that rotate integrally with each other has been described as an example. However, the present disclosure is not limited to such a configuration, and for example, the planetary gear mechanism 31 may be a single pinion planetary gear mechanism.

(2) In the above embodiment, the configuration has been described as an example in which the drive device for vehicle 100 includes the differential gear mechanism 4 that distributes torque to the pair of wheels W and the differential case 41 functions as the output member 2, but the present disclosure is not limited to such a configuration. For example, in a case where the drive device for vehicle 100 does not include the differential gear mechanism 4 and the rotating electric machine 1 functions as a driving force source of one wheel W, an element that rotates integrally with a drive shaft drivingly connected to the wheel W may be set as the output member 2.

(3) Note that the configuration disclosed in each of the above-described embodiments can be applied in combination with the configuration disclosed in another embodiment as long as there is no contradiction. Regarding other configurations, the embodiments disclosed in the present description are merely examples in all respects. Therefore, various modifications can be appropriately made without departing from the gist of the present disclosure.

Outline of the Above Embodiments

Hereinafter, an outline of the drive device for vehicle described above is described.

A drive device for vehicle (100) including:

a rotating electric machine including a rotor (12);

an output member (2) drivingly connected to a wheel (W) included in a vehicle;

a power transmission mechanism (3) that transmits rotation of the rotor (12) to the output member (2); and a differential gear mechanism (4) that distributes torque transmitted to the output member (2) to a pair of the wheels (W), in which the power transmission mechanism (3) includes a planetary gear mechanism (31), a first gear (32), and a second gear (33), the second gear (33) meshes with the first gear (32) and is connected to the output member (2) so as to rotate integrally with the output member (2), defining that a direction along a rotation axis of the rotor (12) is an axial direction (L), one side in the axial direction (L) is an axial first side (L1), the other side in the axial direction (L) is an axial second side (L2), and one of the pair of wheels (W) disposed on the axial first side (L1) is a target wheel (WT), the differential gear mechanism (4) is connected to the target wheel (WT) via a connecting member (6), the rotor (12), the planetary gear mechanism (31), and the first gear (32) are disposed on a first axis (X1) in a described order from the axial first side (L1) toward the axial second side (L2), the connecting member (6), the differential gear mechanism (4), and the second gear (33) are disposed on a second axis (X2) parallel to the first axis (X1) in a described order from the axial first side (L1) toward the axial second side (L2), the planetary gear mechanism (31) has a smaller diameter than the rotating electric machine (1) and a larger diameter than the first gear (32), and the differential gear mechanism (4) has a smaller diameter than the second gear (33) and a larger diameter than the connecting member (6).

According to the present configuration, the rotating electric machine (1), the planetary gear mechanism (31), and the first gear (32) disposed on the first axis (X1) are disposed in the order in which the dimension in the radial direction (R) gradually decreases from the axial first side (L1) toward the axial second side (L2), and the connecting member (6), the differential gear mechanism (4), and the second gear (33) disposed on the second axis (X2) are disposed in the order in which the dimension in the radial direction (R) gradually increases from the axial first side (L1) toward the axial second side (L2). Therefore, an inter-axis distance between the first axis (X1) and the second axis (X2) is suppressed short easily while interference between each element on the first axis (X1) and each element on the second axis (X2) are avoided, and the dimension in the radial direction (R) of the drive device for vehicle (100) can be easily suppressed small.

Here, in axial direction view along the axial direction (L), the rotating electric machine (1) and the differential gear mechanism (4) preferably overlap each other and the second gear (33) and the planetary gear mechanism (31) preferably overlap each other.

According to the present configuration, as compared with a configuration in which the rotating electric machine (1) and the differential gear mechanism (4) do not overlap each other in axial direction view and a configuration in which the second gear (33) and the planetary gear mechanism (31) do not overlap each other in axial direction view, the dimension in the radial direction (R) of the drive device for vehicle (100) can be suppressed small.

Further, the planetary gear mechanism (31) preferably has a disposition region in the axial direction (L), the disposition region overlapping a disposition region of the differential gear mechanism (4) in the axial direction (L), and the rotating electric machine (1) preferably has a disposition region in the axial direction (L), the disposition region overlapping a disposition region of the connecting member (6) in the axial direction (L).

According to the present configuration, the two elements, which are the rotating electric machine (1) and the planetary gear mechanism (31) disposed on the first axis (X1), and the two elements, which are the connecting member (6) and the differential gear mechanism (4) disposed on the second axis (X2), can be disposed such that the disposition region of the relatively large-diameter element in the axial direction (L) and the disposition region of the relatively small-diameter element in the axial direction (L) overlap each other. Therefore, the inter-axis distance between the first axis (X1) and the second axis (X2) can be easily suppressed short.

Further, an inverter device (20) that controls driving of the rotating electric machine (1) is preferably provided, and at least a part of the inverter device (20) is preferably disposed on the outer side in the radial direction of the differential gear mechanism (4).

According to the present configuration, because the inverter device (20) can be disposed by using a space on the outer side in the radial direction of the differential gear mechanism (4) having a smaller diameter than the second gear (33), an increase in size of the drive device for vehicle (100) caused by disposing the inverter device (20) can be easily suppressed.

Further, an inverter device (20) that controls driving of the rotating electric machine (1) is preferably provided, and at least a part of the inverter device (20) is preferably disposed on the outer side in the radial direction of the connecting member (6).

According to the present configuration, because the inverter device (20) can be disposed by using a space on the outer side in the radial direction of the connecting member (6) having a smaller diameter than the differential gear mechanism (4), an increase in size of the drive device for vehicle (100) caused by disposing the inverter device (20) can be easily suppressed.

Further, an inverter device (20) that controls driving of the rotating electric machine (1) is preferably provided, and at least a part of the inverter device (20) is preferably disposed on the outer side in the radial direction of the planetary gear mechanism (31).

According to the present configuration, because the inverter device (20) can be disposed by using a space on the outer side in the radial direction of the planetary gear mechanism (31) having a smaller diameter than the rotating electric machine (1), an increase in size of the drive device for vehicle (100) caused by disposing the inverter device (20) can be easily suppressed.

Further, a catch tank (80) that stores oil scraped up by the planetary gear mechanism (31) or the second gear (33) is preferably provided, and the catch tank (80) is preferably disposed on the outer side in the radial direction of the first gear (32).

According to the present configuration, the catch tank (80) can be disposed by using a space on the outer side in the radial direction of the first gear (32). Therefore, particularly in a case where the first gear (32) is formed to have a smaller diameter than the second gear (33), an increase in size of the drive device for vehicle (100) caused by disposing the catch tank (80) can be easily suppressed.

Further, the planetary gear mechanism (31) preferably includes a sun gear (SG), a carrier (CR), and a ring gear (RG), the sun gear (SG) is preferably connected to the rotor (12) so as to rotate integrally with the rotor (12), the carrier (CR) preferably rotatably supports a first pinion gear (PG1) and a second pinion gear (PG2) that rotate integrally with each other, the first pinion gear (PG1) preferably meshes with the sun gear (SG), the second pinion gear (PG2) preferably meshes with the ring gear (RG), one of the carrier (CR) and the ring gear (RG) is preferably connected to the first gear (32) so as to rotate integrally with the first gear (32), and the other of the carrier (CR) and the ring gear (RG) is preferably fixed to a non-rotating member (NR).

According to the present configuration, the carrier (CR) of the planetary gear mechanism (31) supports the first pinion gear (PG1) and the second pinion gear (PG2) that rotate integrally with each other. The sun gear (SG) that rotates integrally with the rotor (12) meshes with the first pinion gear (PG1). Further, one of the carrier (CR) and the ring gear (RG) is connected to the first gear (32) so as to rotate integrally with the first gear (32), and the other of the carrier (CR) and the ring gear (RG) is fixed to the non-rotating member (NR). The ring gear (RG) meshes with the second pinion gear (PG2). Here, because the gear diameters and the number of teeth of the first pinion gear (PG1) and the second pinion gear (PG2) can be set independently, according to the present configuration, a large reduction ratio can be easily secured by the planetary gear mechanism (31) configured as described above without having a plurality of planetary gear mechanisms provided. In addition, this also enables even a small rotating electric machine (1) to transmit high torque to the output member (2).

In the above configuration, the ring gear (RG) is preferably fixed to the non-rotating member (NR), and the second pinion gear (PG2) is preferably disposed closer to the rotating electric machine (1) side in the axial direction (L) than the first pinion gear (PG1).

In general, a support member as the non-rotating member (NR) is often provided between the rotating electric machine (1) and the planetary gear mechanism (31) in the axial direction (L) in order to rotatably support the rotor (12). According to the present configuration, the ring gear (RG) meshing with the second pinion gear (PG2) disposed relatively close to the rotating electric machine (1) can be easily fixed to the non-rotating member (NR). This allows a configuration to be easily realized in which the ring gear (RG) is fixed to the non-rotating member (NR) while the dimension of the drive device for vehicle (100) in the axial direction (L) is suppressed small.

The drive device for vehicle according to the present disclosure only needs to be able to achieve at least one of the effects described above.

INDUSTRIAL APPLICABILITY

The technique related to the present disclosure can be used for a drive device for vehicle including a rotating electric machine including a rotor, an output member drivingly connected to a wheel, a power transmission mechanism that transmits rotation of the rotor to the output member, and a differential gear mechanism that distributes torque transmitted to the output member to the pair of wheels.

REFERENCE SIGNS LIST

100: Drive device for vehicle, 1: Rotating electric machine, 12: Rotor, 2: Output member, 20: Inverter device, 3: Power transmission mechanism, 31: Planetary gear mechanism, 32: First gear, 33: Second gear, 4: Differential gear mechanism, 6: Transmission shaft (Connecting member), 80: Catch tank, SG: Sun gear, CR: Carrier, RG: Ring gear, PG1: First pinion gear, PG2: Second pinion gear, W: Wheel, WT: Target wheel, NR: Non-rotating member, L: Axial direction, L1: Axial first side, L2: Axial second side, X1: First axis, and X2: Second axis

The invention claimed is:

1. A drive device for vehicle comprising:

a rotating electric machine including a rotor;

an output member drivingly connected to a wheel included in a vehicle;

a power transmission mechanism that transmits rotation of the rotor to the output member;

a differential gear mechanism that distributes torque transmitted to the output member to a pair of the wheels; and an inverter device that controls driving of the rotating electric machine, wherein the power transmission mechanism includes a planetary gear mechanism, a first gear, and a second gear, the second gear meshes with the first gear and is connected to the output member so as to rotate integrally with the output member, defining that a direction along a rotation axis of the rotor is an axial direction, one side in the axial direction is an axial first side, an other side in the axial direction is an axial second side, and one of the pair of wheels disposed on the axial first side is a target wheel, the differential gear mechanism is connected to the target wheel via a connecting member, the rotor, the planetary gear mechanism, and the first gear are disposed on a first axis in a described order from the axial first side toward the axial second side, the connecting member, the differential gear mechanism, and the second gear are disposed on a second axis parallel to the first axis in a described order from the axial first side toward the axial second side, the planetary gear mechanism has a smaller diameter than the rotating electric machine and a larger diameter than the first gear, the differential gear mechanism has a smaller diameter than the second gear and a larger diameter than the connecting member, the inverter device includes a power module in which a plurality of elements constituting an inverter circuit are modularized and a capacitor for smoothing a voltage between positive and negative electrodes on a DC side of the inverter circuit, the capacitor is longer in a vertical direction than the power module, the power module is disposed on an upper side of the differential gear mechanism and at a position overlapping the differential gear mechanism in a vertical direction view along the vertical direction, and the capacitor is disposed on an upper side of the connecting member and at a position overlapping the connecting member in the vertical direction view along the vertical direction.

2. The drive device for vehicle according to claim 1, wherein, in axial direction view along the axial direction, the rotating electric machine and the differential gear mechanism overlap each other and the second gear and the planetary gear mechanism overlap each other.

3. The drive device for vehicle according to claim 1, wherein, the planetary gear mechanism has a disposition region in the axial direction, the disposition region overlapping a disposition region of the differential gear mechanism in the axial direction, and the rotating electric machine has a disposition region in the axial direction, the disposition region overlapping a disposition region of the connecting member in the axial direction.

4. The drive device for vehicle according to claim 1, wherein the inverter device has at least a part of the inverter device disposed on an outer side in a radial direction of the planetary gear mechanism.

5. The drive device for vehicle according to claim 1, further comprising a catch tank that stores oil scraped up by the planetary gear mechanism or the second gear, wherein the catch tank is disposed on an outer side in a radial direction of the first gear.

6. The drive device for vehicle according to claim 1, wherein, the planetary gear mechanism includes a sun gear, a carrier, and a ring gear, the sun gear is connected to the rotor so as to rotate integrally with the rotor, the carrier rotatably supports a first pinion gear and a second pinion gear that rotate integrally with each other, the first pinion gear meshes with the sun gear, the second pinion gear meshes with the ring gear, one of the carrier and the ring gear is connected to the first gear so as to rotate integrally with the first gear, and an other of the carrier and the ring gear is fixed to a non-rotating member.

7. The drive device for vehicle according to claim 6, wherein, the ring gear is fixed to the non-rotating member, and the second pinion gear is disposed closer to a rotating electric machine side in the axial direction than the first pinion gear.

8. A drive device for vehicle comprising:

a rotating electric machine including a rotor;

an output member drivingly connected to a wheel included in a vehicle;

a power transmission mechanism that transmits rotation of the rotor to the output member; and a differential gear mechanism that distributes torque transmitted to the output member to a pair of the wheels, wherein the power transmission mechanism includes a planetary gear mechanism, a first gear, and a second gear, the second gear meshes with the first gear and is connected to the output member so as to rotate integrally with the output member, defining that a direction along a rotation axis of the rotor is an axial direction, one side in the axial direction is an axial first side, an other side in the axial direction is an axial second side, and one of the pair of wheels disposed on the axial first side is a target wheel, the differential gear mechanism is connected to the target wheel via a connecting member, the rotor, the planetary gear mechanism, and the first gear are disposed on a first axis in a described order from the axial first side toward the axial second side, the connecting member, the differential gear mechanism, and the second gear are disposed on a second axis parallel to the first axis in a described order from the axial first side toward the axial second side, the planetary gear mechanism has a smaller diameter than the rotating electric machine and a larger diameter than the first gear, the differential gear mechanism has a smaller diameter than the second gear and a larger diameter than the connecting member, the planetary gear mechanism includes a sun gear, a carrier and a ring gear, the sun gear is connected to the rotor so as to rotate integrally with the rotor, the carrier rotatably supports a first pinion gear and a second pinion gear that rotate integrally with each other, the first pinion gear meshes with the sun gear, the second pinion has a smaller diameter than the first pinion gear and meshes with the ring gear, one of the carrier and the ring gear is connected to the first gear so as to rotate integrally with the first gear, and an other of the carrier and the ring gear is fixed to a non-rotating member.

9. The drive device for vehicle according to claim 8, wherein, in axial direction view along the axial direction, the rotating electric machine and the differential gear mechanism overlap each other and the second gear and the planetary gear mechanism overlap each other.

10. The drive device for vehicle according to claim 8, wherein, the planetary gear mechanism has a disposition region in the axial direction, the disposition region overlapping a disposition region of the differential gear mechanism in the axial direction, and the rotating electric machine has a disposition region in the axial direction, the disposition region overlapping a disposition region of the connecting member in the axial direction.

11. The drive device for vehicle according to claim 8, further comprising an inverter device that controls driving of the rotating electric machine, wherein the inverter device has at least a part of the inverter device disposed on an outer side in a radial direction of the differential gear mechanism.

12. The drive device for vehicle according to claim 8, further comprising an inverter device that controls driving of the rotating electric machine, wherein the inverter device has at least a part of the inverter device disposed on an outer side in a radial direction of the connecting member.

13. The drive device for vehicle according to claim 8, further comprising an inverter device that controls driving of the rotating electric machine, wherein the inverter device has at least a part of the inverter device disposed on an outer side in a radial direction of the planetary gear mechanism.

14. The drive device for vehicle according to claim 8, further comprising a catch tank that stores oil scraped up by the planetary gear mechanism or the second gear, wherein the catch tank is disposed on an outer side in a radial direction of the first gear.

15. The drive device for vehicle according to claim 8, wherein, the ring gear is fixed to the non-rotating member, and the second pinion gear is disposed closer to a rotating electric machine side in the axial direction than the first pinion gear.

* * * * *